(12) United States Patent
Aronson

(10) Patent No.: US 11,123,157 B2
(45) Date of Patent: Sep. 21, 2021

(54) UNIVERSAL ATTACHMENT FOR AN ORTHODONTIC ALIGNER

(71) Applicant: Ross Aronson, Rye Brook, NY (US)

(72) Inventor: Ross Aronson, Rye Brook, NY (US)

(*) Notice: Subject to any disclaimer, the term of this patent is extended or adjusted under 35 U.S.C. 154(b) by 521 days.

(21) Appl. No.: 16/152,541

(22) Filed: Oct. 5, 2018

(65) Prior Publication Data

US 2020/0107908 A1    Apr. 9, 2020

(51) Int. Cl.
*A61C 7/08*    (2006.01)
*A61C 7/16*    (2006.01)

(52) U.S. Cl.
CPC . *A61C 7/08* (2013.01); *A61C 7/16* (2013.01)

(58) Field of Classification Search
CPC .... A61C 7/08; A61C 7/12; A61C 7/14; A61C 7/143; A61C 7/16
See application file for complete search history.

(56) References Cited

U.S. PATENT DOCUMENTS

| | | | | |
|---|---|---|---|---|
| 3,193,930 | A * | 7/1965 | Bien | A61C 7/143 433/15 |
| 5,174,753 | A * | 12/1992 | Wool | A61C 7/20 433/20 |
| 6,309,215 | B1 * | 10/2001 | Phan | A61C 7/00 433/24 |
| 6,450,807 | B1 | 9/2002 | Chisti et al. | |
| 7,121,825 | B2 | 10/2006 | Chisti et al. | |
| 10,004,573 | B2 * | 6/2018 | Widu | A61C 7/30 |
| 10,299,894 | B2 * | 5/2019 | Tanugula | G06F 30/00 |
| 10,799,323 | B2 * | 10/2020 | Skarin | A61C 7/287 |
| 2002/0106604 | A1 * | 8/2002 | Phan | A61C 7/00 433/24 |
| 2004/0229183 | A1 * | 11/2004 | Knopp | A61C 7/00 433/6 |
| 2006/0223022 | A1 * | 10/2006 | Solomon | A61C 7/08 433/6 |
| 2009/0280450 | A1 * | 11/2009 | Kuo | A61C 7/08 433/9 |
| 2009/0291406 | A1 * | 11/2009 | Namiranian | A61C 7/08 433/24 |
| 2011/0244413 | A1 * | 10/2011 | Teasdale | A61C 7/08 433/6 |
| 2015/0182306 | A1 * | 7/2015 | Chen | A61C 7/143 433/9 |
| 2016/0051341 | A1 * | 2/2016 | Webber | A61C 7/08 433/6 |
| 2016/0199155 | A1 * | 7/2016 | Bosio | A61C 7/282 433/15 |
| 2018/0168788 | A1 * | 6/2018 | Fernie | A61C 19/063 |
| 2019/0314119 | A1 * | 10/2019 | Kopelman | A61C 7/023 |
| 2020/0188062 | A1 * | 6/2020 | Kopelman | A61C 7/16 |

* cited by examiner

*Primary Examiner* — Jacqueline T Johanas
*Assistant Examiner* — Matthew P Saunders
(74) *Attorney, Agent, or Firm* — Andrew F. Young; Nolte Lackenbach Siegel

(57) ABSTRACT

A universal attachment device configured to be secured to a tooth for engagement with a removable dental positioning appliance including a base including a lateral surface including a plurality of faces for effecting a plurality of repositioning forces on a tooth, wherein when the device is engaged with the appliance and when the base is secured to the tooth, one of the repositioning forces is effected upon the tooth and at least one of the other repositioning forces are not effected upon the tooth. A method of using the device is also disclosed.

16 Claims, 10 Drawing Sheets

UNIVERSAL ATTACHMENT FOR AN ORTHODONTIC ALIGNER

BACKGROUND

Technical Field

The present disclosure relates generally to orthodontic aligners, and more particularly to attachments for securing orthodontic aligners to teeth.

Description of the Related Art

Orthodontics is the practice of manipulating a patient's teeth to improve the appearance and function of the teeth. Removable tooth positioning appliances (invisible braces), such as clear plastic aligners and retainers that tightly fit over teeth are commonly used in orthodontic treatments as an alternative to braces and other bonded orthodontic equipment for controlled tooth movement to a pre-determined position. Various systems and methods for positioning teeth have been devised. For example, systems and methods for positioning are disclosed in U.S. Pat. Nos. 6,309,215; 6,450,807; and 7,121,825, which are assigned to Align Technology, Inc., the contents of which are hereby incorporated by references.

As shown in FIG. 1, a skull 10 has a lower jawbone 20 having a lower jaw 100 and an upper jawbone 22 having an upper jaw 101. Each of the lower jaw 100 and the upper jaw 101 include teeth 102. A joint 30 known as the temporal mandibular joint (TMJ) make it possible to open and close one's mouth. As the external auditory meatus 31 which is the exterior of the ear canal is separated from the TMJ 30 by a bony anterior wall of variable thickness, injuries to the TMJ 30 often result in pain or discomfort being felt in one's ears. Thus, an uneven or misaligned bite can cause TMJ disorders that cause pain and discomfort in one's jaw and in one's ears. Accordingly, it is desirable to correct the alignment of teeth so as to ensure a proper fight and to minimize the likelihood of pain and discomfort that may result from the misalignment of teeth.

As shown in FIG. 2A, the lower jaw 100 includes teeth 102 that may be moved from an initial tooth arrangement to a final tooth arrangement. As a frame of reference to describe how a tooth may be moved, an arbitrary centerline CL may be drawn through the tooth 102. With reference to the centerline CL, each tooth 102 may be moved in orthogonal directions with respect to the center line CL as represented by axes 104, 106, and 108 (where 104 is the centerline). To effect root angulation of the tooth 102, a force applied as indicated by directional arrow 110 about axis 108 may be applied to the tooth. To effect a torque on the tooth 102, a force applied as indicated by directional arrow 113 about axis 106 may be applied to the tooth 102. To effect a rotation upon the tooth 102, a force as indicated by directional arrow 112 about axis 104 may be applied to the tooth 102. It is to be understood that the direction of the forces to effect root angulation, torque, and rotation would vary depending on the location of the tooth within the mouth as the teeth 102 are disposed along a rounded jaw. In addition, the tooth 102 may be intruded (pushed deeper into the gum) or extruded (partial displacement out of its socket away from the gum) when the tooth is moved or translated along axis 104 or its centerline CL. Thus, all possible free-form motions of the tooth 102 can be performed.

FIG. 2B shows how the magnitude of any tooth movement may be defined in terms of a maximum linear translation of any point P on a tooth 102. Each point $P_1$ will undergo a cumulative translation as that tooth is moved in any of the orthogonal or rotational directions defined in FIG. 2A. That is, while the point will usually follow a nonlinear path, there is a linear distance between any point in the tooth when determined at any two times during the treatment. Thus, an arbitrary point $P_1$ may in fact undergo a true side-to-side translation as indicated by arrow $d_1$, while a second arbitration point $P_2$ may travel along an arcuate path, resulting in a final translation $d_2$.

FIG. 2C shows a prior art adjustment appliance 11 that is worn by the patient in order to achieve an incremental repositioning of individual teeth in the jaw as described generally above. Conventionally, the appliance is a polymeric shell that has a teeth receiving cavity. As set forth in the prior applications, each polymeric shell may be configured so that its tooth receiving cavity has a geometry corresponding to an intermediate or final tooth arrangement intended for the appliance. The patient's teeth are repositioned from their initial tooth arrangement to a final tooth arrangement by placing a series of incremental position adjustment appliances over the patient's teeth. The adjustment appliances are generated at the beginning of the treatment, and the patient wears each appliance until the pressure of each appliance on the teeth can no longer be felt. At that point, the patient replaces the current adjustment appliance with the next adjustment appliance in the series until no more appliance remains. Conveniently, the appliances are generally not affixed to the teeth and the patient may place and replace the appliances at any time during the procedure. The final appliance or several appliances in the series may have a geometry or geometries selected to overcorrect the tooth arrangement, i.e., have a geometry which would (if fully achieved) move individual teeth beyond the tooth arrangement which has been selected as the final desired position of the teeth. Such overcorrection may be desirable in order to offset potential relapse after the repositioning method has been terminated, i.e., to permit some movement of individual teeth back toward their pre-corrected positions. Overcorrection may also be beneficial to speed the rate of correction, i.e., by having an appliance with a geometry that is positioned beyond a desired intermediate or final position, the individual teeth will be shifted toward the position at a greater rate. In such cases, the use of an appliance can be terminated before the teeth reach the positions defined by the appliance.

The polymeric shell 111 can fit over all teeth present in the upper or lower jaw. Often, only certain one(s) of the teeth will be repositioned while others of the teeth will provide a base or an anchor region for holding the appliance 111 in place as the appliance 111 applies a resilient repositioning force against the tooth or teeth to be repositioned. In complex cases, however, multiple teeth may be repositioned at some point during the treatment. In such cases, the teeth which are moved can also serve as a base or anchor region for holding the repositioning appliance. Appliance 111 is referred to herein interchangeably as a polymeric shell or a dental positioning appliance or as an aligner or as an appliance.

The polymeric appliance 111 of FIG. 2C may be formed from a thin sheet of a suitable elastomeric polymer, such as Tru-Tain 0.03 in, thermal forming dental material, available from Tru-Tain Plastics, Rochester, Minn. Usually, no wires or other means will be provided for holding the appliance in place over the teeth. In some cases, however, it will be desirable or necessary to provide individual anchors on teeth with corresponding receptacles or apertures in the appliance 100 so that the appliance can apply an upward force on the tooth which would not be possible in the absence of such an anchor. The polymeric appliance 111 is more generally referred to as an aligner.

Initially, when placed on teeth, the appliance 111 is ill-fitting because it is shaped to fit the alignment that the teeth need to be at the end of the treatment period, e.g., 2 weeks. It should be noted that several treatment periods may be required to move the teeth into their ultimate desired positions with each of the treatment periods incrementally moving the teeth toward the desired positions for the teeth. The misfit of the aligner or appliance 111 with respect to the teeth is what urges the teeth to move toward being in alignment with the shape of the appliance 111. Gradually, the teeth adjust to approximate the shape of aligner or appliance 111 such that it will fit the teeth well as the alignment of the teeth for that stage has been achieved. In other words, several aligners or appliances 111 may have to be cast for each stage of a series of stages that collectively will be used to straighten the teeth. At each stage, the tooth movement may be in the range of 0.25 to 0.33 mm. While each stage may seem to be a small amount of movement, after a number (e.g., 10-30) aligners have been worn, the total amount of tooth movement may be substantial.

The movement of teeth by plastic aligners may start with capturing the current tooth positions by representing them digitally for manipulation to correct a malocclusion. A digital model is fabricated through an intraoral scan, or other true-to-size representation of a person's malocclusion (malocclusion is tooth or jaw tooth relationship that deviates from normal in any plane of space). First, each tooth is digitally sectioned into its own entity to allow for movement and collision detection in the software. Next, all the teeth are incrementally moved, depending on the plane of space, by 0.1 mm-0.2 mm per "stage" and ultimately through many stages to their destination at the ideal endpoint. Each increment is represented by a digital model; usually an STL file that is 3D printed, there are usually 40-50 increments (commonly referred to as stages). These models are then used to fabricate an aligner by vacuum-forming a plastic tray to that model. When the teeth in the mouth are at time point 0, they will wear an aligner designed to the digital tooth position (stage) at time point 1 (the next time point). The aligner is thus providing a force to the teeth—as it is fabricated for a position the teeth are not currently occupying (about 0.1 mm different in every plane of space as needed). The stretch of the plastic of which aligner is fabricated allows the aligner to seat on the existing tooth position by elastically distorting to the current location/orientation/shape of the tooth from its fabricated shape. The material memory within the plastic trying to reform to its fabricated shape is what applies the force to the teeth for movement. Thus, the aligners need undercuts or retentive faces to press against or they will resume their fabricated shape without applying a force to the tooth. This process is repeated, usually on a weekly basis, until the teeth are the final time point or stage. In turn that aligner moves the teeth incrementally from one stage to the next.

ALIGN TECHNOLOGY's INVISALIGN's CLINCHECK software determines which teeth require the placement of attachments. This determination, as well as the determination of the shape and configuration of the attachment, is conventionally performed prior to securing any attachments to any teeth. In particular, dental impressions are taken and technicians may perform a digital scan of the dental impressions using a computed tomography (CT) scanner to generate a 3-dimensional model of the upper and lower teeth. Once the virtual modeling of your teeth has been completed and your prescription form has been evaluated, an Invisalign® technician will create an on-screen animation showing a proposed treatment plan for your case (sequence of tooth movements that can give the results that your dentist has requested). ALIGN TECHNOLOGY's INVISALIGN's CLINCHECK software animates and simulates the treatment to be performed. The software provides digital information to generate a pair of aligners for the upper and lower teeth for each stage of the treatment plan.

Typically, and especially with INVISALIGN aligners which more closely approximate the patient's gumline, teeth are poorly shaped for such aligners to move them. Thus, in most cases, the use of attachments or attachment devices is required. For example, some types of alignment changes are difficult to accomplish with removable braces. It might be that the needed movement itself creates the challenge, such as rotating a tooth or extruding it (bringing more of it above the gum line). In other cases, some characteristic of a tooth (size, shape, angulation) may make it difficult for the aligner to apply pressure to it. In such situations, the use of an attachment may achieve the desired results. In particular, the attachment provides an anchor point that helps direct the forces of the aligner more effectively and predictably to the tooth. Front teeth tend to intrude into the gums away from the aligner due to their wedge shape—making them lose "track" during treatment. Posterior teeth resist rotation due to their round form as there is nothing for the aligner to grip on rounder teeth. This is much like trying to grip a doorknob that is round when your hands are wet: if that doorknob was in the shape of a star, or bar, you would be able to grab it, even with wet hands, and turn the knob. They resist extrusion due to lack of appropriate retentive areas and they resist intrusion because the extrusive counterforce is not transmitted well to the adjacent teeth due to their morphology as previously described. Currently, these shortcomings of three-dimensional tooth control have be mostly overcome by designing customized "attachments" for the teeth. An attachment will provide a pushing surface perpendicular to the surface of the tooth (much like adding triangles to a flat round doorknob to allow for a star shape, letting your fingers grip into a retentive area) to allow the aligner design to press against the attachment, and not just the anatomy of the tooth, therefore increasing efficiency and control.

Conventionally, a template for creating the attachments is made from the digitized scan of the teeth. Such a template looks similar to a regular aligner with the exception that it has small bulges in it that correspond to specific locations, on specific teeth, where your attachments need to be placed. The bulges in the template are filled in with tooth-colored dental bonding (dental composite). The shape of the bulge creates the shape of the attachment being placed (rectangular, square triangle, round, ellipsoid). Once the bonding cures and hardens, the template is removed and the small bump of bonding that remains is the "attachment". Although the dentist attempts to remove excess material, the exact size and dimensions of the attachment are invariably slightly different than that determined by the by the ALIGN TECHNOLOGY's INVISALIGN's CLINCHECK software and the mold of the template. This is because some excess material or flash is likely to remain despite the dentist's attempts to remove the material. As the purpose of the aligner, at each stage, is to gently move the teeth by moving the teeth by small incremental amounts, the remaining excess material may interfere with the fit of the aligner and the results may be sub-optimal.

Attachments are placed at specific locations on specific teeth, and may have rectangular, square, circular, ellipsoidal, or triangular shapes. The specific shape and orientation is dictated by the specific purpose it serves. That is, the shape and orientation of the attachment is determined based on what movement (e.g., tooth rotation, translation, intrusion or extrusion) of the tooth is desired. For example, an ellipsoidal (oval) attachment might measure about 1/16th of an inch wide, a little more than that in height, and roughly 1/32nd inches thick (about the same thickness as a credit card). Also for example, a rectangular attachment that may be 1/16th of an inch thick vertically aligned rectangular attachments may be placed on teeth to assist with translation (moving into an adjacent space), tipping, torquing or rotational movements. In another example, a 1/16th of an inch-thick horizontal beveled rectangular attachments may be used to aid with intrusive (pushing in) or extrusive (pulling out) tooth movements.

Attachment devices, conventionally, can also be rectangular or wedge-shaped. When the attachment is rectangular, the alignment of the appliance and the attachment is important because unless properly aligned, the appliance will not be able to be placed onto the attachment due to the limit in the elasticity of the aligning tray. Wedge-shaped attachments are more forgiving because even if the shape is slightly off, the wedge-shaped appliance would tend to slide somewhat into place into the corresponding indentation of the appliance.

Referring to FIG. 3, an attachment device 200 is shown bonded to a tooth 102 above the gingiva G. The attachment device 200 typically includes an attachment body 201 which is bonded to the tooth 102 with a bonding 201. While preferably, the bonding 201 does not extend past the back surface of the attachment body 201 that contacts the tooth 102, often the bonding 201 will have some flash and cover more tooth surface than the surface area of the attachment body 201. The appliance 111 is configured to accommodate the shape of the attachment 200 such that when worn, the appliance 111 urges the attachment 200 to move the tooth 102 toward a desired position when an optimal force is applied for a sufficient duration of time for a particular stage of the treatment to achieve the desired tooth movements.

For example, as shown in FIG. 4, an appliance 300 that is substantially similar to the appliance 111 is shown, except that it also includes a negative impression 302 to accommodate the attachment device 200. The aligner or appliance 300 applies repositioning forces to the attachment device 100 that causes the tooth 102 to which the attachment device 100 is bonded to move toward the ultimate desired position. Attachment devices, such as attachment device 200, allows the aligner a more positive grasp on the tooth.

FIG. 5 illustrates conventional attachments A that are bonded to teeth 102. Conventional attachments are generally selected from two shapes, namely, cubes or rectangular prisms that can be oriented so that they are "beveled" in a desired direction to have a longer face in a given orientation. Each of the attachments A would require a corresponding negative impression 302 on the aligner or appliance 300 to accommodate the attachment A and to apply a force against the attachment A to move in a desired manner.

When the appliance 300 is placed onto the teeth 102, it applies controlled forces to the teeth 102 as it applies a force against the attachment devices 200 bonded to the teeth 102. For this to be accomplished, conventionally, a high degree of precision is needed such that the attachment device 200 and the appliance 300 are shaped and positioned relative to one another such that when the appliance 300 is placed upon the teeth 102, the appliance 300 snuggly fits and engages the attachment device 200. Conventionally, therefore, the margin of error for the relative positioning of the appliance 300 and the attachment device are thus low. In addition to precise placement, each attachment device 200 must have a customized shape so that it can engage the indented structure of the appliance 300. If the shape and position of the attachment device 200 is not correct, then the appliance 300 will not be able to be placed atop the teeth 102. It is noted that the appliance 300 has a shape that may be slightly different from that of the teeth 102 on which the appliance 300 is to be placed but not so different as to prevent the placement of the appliance 300 thereon. Rather, the flexibility of the appliance 300 permits placement of the appliance 300 onto the teeth 102 and the slight difference on the configuration of the appliance 300 relative to the teeth 102 applies a gentle force to the teeth 102 that over time causes the teeth 102 to move into a desired corrected position.

Since both the shape and position of the attachment devices 200 require a high degree of customization, the amount of time that is taken by the clinician, setting up the tooth movements at the computer is considerable. Further, conventionally, the placement of the attachment devices 200 occurs after computer modeling of the teeth has occurred. Such computer modeling is used to determine the configuration of the appliance. While the computer modeling attempts to account for the attachment devices when modeling the teeth, it is up to the clinician to choose the shape, size, and orientation of the attachments on the computerized treatment plan, this is a time consuming and difficult process. Bonding material that is used to secure the attachment device 200 to a tooth 102 will necessarily cause some error in such modeling because of a phenomenon known as 'flash' in which some of the bonding material moves into areas adjacent to what is being attached. This sometimes results from an excess of bonding material being used. The flash generated displaces the aligner from the tooth, altering how and where the aligner will contact the tooth because the flash provides a surface not accounted for by the computer prediction from which the aligning trays are fabricated. As the aligning trays enact on non-captured surfaces, unintentional tooth movements can and do often occur.

Conventionally, until the computer modeling is created, the attachment devices 200 cannot be secured to the teeth 102 as the configuration of the attachment device 200 has yet to be determined. Accordingly, the computer models do not account for slight varying features that might exist whether from slight errors in the placement of the attachments or flash or excess bonding material changing the resulting shape of the teeth when the attachments are secured to the teeth. Because the attachment presented here is placed on the teeth prior to the digital scan or impression of the teeth used to fabricate the treatment aligners, any flash produced is accounted for in the scan and in the subsequent treatment aligners. The reason this attachment can be placed prior to the scan is because it supports tooth movement in all planes, something no other attachment does and thus no other attachment can be placed prior to a digital scan or impression.

It should be understood that nothing in the background section shall be construed as an admission of prior art unless otherwise noted and the examples that were discussed have been provided so as to provide a better understanding of the problems addressed by the current invention.

SUMMARY

As will be discussed in greater detail herein, the present disclosure advantageously provides a universal attachment member that can be bonded or otherwise secured to teeth with little consideration of the final desired tooth positioning. Instead, the same universal attachment member can be used and positioned in the same way relative to the lateral tooth surfaces regardless how the appliance is configured to apply forces to urge the teeth to desired positions. This is an advantageous feature as comparted to conventional attachment configurations and shapes which are chosen and placed on the teeth in the digital treatment plan for a specific tooth movement. In contrast, conventional attachments only provide adequate leverage for movements in one or two planes of space.

A universal attachment device may be configured to be secured to a tooth for engagement with a removable dental positioning appliance including a base including a lateral surface including a plurality of faces for effecting a plurality of repositioning forces on a tooth, wherein when the device is engaged with the appliance and when the base is secured to the tooth, one of the repositioning forces is effected upon the tooth and at least one of the other repositioning forces are not effected upon the tooth.

In an embodiment, a universal attachment device may be configured to be secured to a tooth for engagement with a removable dental positioning appliance. The universal attachment device may include: a mounting surface configured to be secured to the tooth; and an attachment surface, the attachment surface generally opposing the mounting surface and including a plurality of movement faces, each of the plurality of movement faces being configured to interact with the removable dental positioning appliance, the interaction of the removable dental appliance with each of the plurality of movement faces effecting a force upon each of the movement faces, the force having a magnitude and a direction, wherein at least one of the movement faces interacts with the removable dental appliance such that the force applied to the at least one of the movement faces has a magnitude that is substantially zero and at least another one of the movement faces interacts with the removable dental appliance such that the force applied to the at least another one of the movement faces has a magnitude that is greater than zero. An application of a combination of forces upon particular ones of the plurality of movement faces may result in a net force upon the tooth to effect a desired repositioning movement of the tooth when the attachment device is attached to the tooth and the removable dental positioned appliance is engaged with the attachment device. The attachment surface may be generally planar and each of the movement faces is angled with respect to the attachment surface.

The universal attachment device may include a first prism that is defined by at least a first portion of the plurality of movement faces. The universal attachment device may include a second prism that is defined by at least a second portion of the plurality of movement faces. The first prism and the second prism may define a 45-degree angle therebetween and define a V-shape, the first prism and the second prism having a common first end, each of the first prism and the second prism extending lengthwise from the common first end. The first and second prisms may be symmetrically disposed relative to one another along an axis bisecting a side of the mounting surface. The mounting surface may be configured as a rectangular shape, and preferably may have a square shape. However, the mounting surface may have any suitable shape provided that it supports the movement faces of the prisms described herein and facilitates securing the prisms to the lateral surfaces of the teeth. Each of the first prism and the second prism include three of the plurality of movement faces, each of the movement faces of the first and second prisms being angled relative to one another.

A universal attachment device may include a V-shaped prism. The V-shaped prism may include: a first movement face and a second movement face, the first and second movement faces extending along a first axis, the first movement face and the second movement face being angled with respect to one another; a third movement face and a fourth movement face, the third and fourth movement faces extending along a second axis, the third movement face and the fourth movement face being angled with respect to one another, the first axis and the second axis defining an angle therebetween; a fifth movement face, the fifth movement face being disposed at a first end of the V-shaped prism, the fourth movement face being angled with respect to first and second movement faces; and a sixth movement face, the sixth movement face being disposed at a second end of the V-shaped prism, the first and second ends of the V-shaped prism being symmetrically positioned with respect to an axis bisecting the V-shaped prism, the sixth movement face being angled with respect to the third and fourth movement faces.

Also disclosed is a method of using the disclosed universal attachment devices. The method may include: providing a universal attachment device, comprising: a V-shaped prism, which may include: a first movement face and a second movement face, the first and second movement faces extending along a first axis, the first movement face and the second movement face being angled with respect to one another; a third movement face and a fourth movement face, the third and fourth movement faces extending along a second axis, the third movement face and the fourth movement face being angled with respect to one another, the first axis and the second axis defining an angle therebetween; a fifth movement face, the fifth movement face being disposed at a first end of the V-shaped prism, the fourth movement face being angled with respect to first and second movement faces; and a sixth movement face, the sixth movement face being disposed at a second end of the V-shaped prism, the first and second ends of the V-shaped prism being symmetrically positioned with respect to an axis bisecting the V-shaped prism, the sixth movement face being angled with respect to the third and fourth movement faces.

The method may also include affixing the universal attachment device to a tooth; and determining a combination of the first movement face, the second movement face, the third movement face, the fourth movement face, the fifth movement face, and the sixth movement face to which to apply a force to effect a tooth movement. The combination of the movement faces that is determined may effect or result in different tooth positioning corrections, which may include but are not limited to: extrusion, intrusion, lateral movement, rotation, root angulation, and/or crown angulation. Preferably, the step of determining may occur after the step of affixing.

The above and other aspects, features and advantages of the present disclosure will become apparent from the following description read in conjunction with the accompanying drawings, in which like reference numerals designate the same elements.

BRIEF DESCRIPTION OF THE DRAWINGS

A further understanding of the present disclosure can be obtained by reference to a preferred embodiment set forth in the illustrations of the accompanying drawings. Although the illustrated preferred embodiment is merely exemplary of methods, structures and compositions for carrying out the present disclosure, both the organization and method of the disclosure, in general, together with further objectives and advantages thereof, may be more easily understood by reference to the drawings and the following description. The drawings are not intended to limit the scope of this disclosure, which is set forth with particularity in the claims as appended or as subsequently amended, but merely to clarify and exemplify the disclosure.

For a more complete understanding of the present disclosure, reference is now made to the following drawings in which.

DETAILED DESCRIPTION

Figure 1:
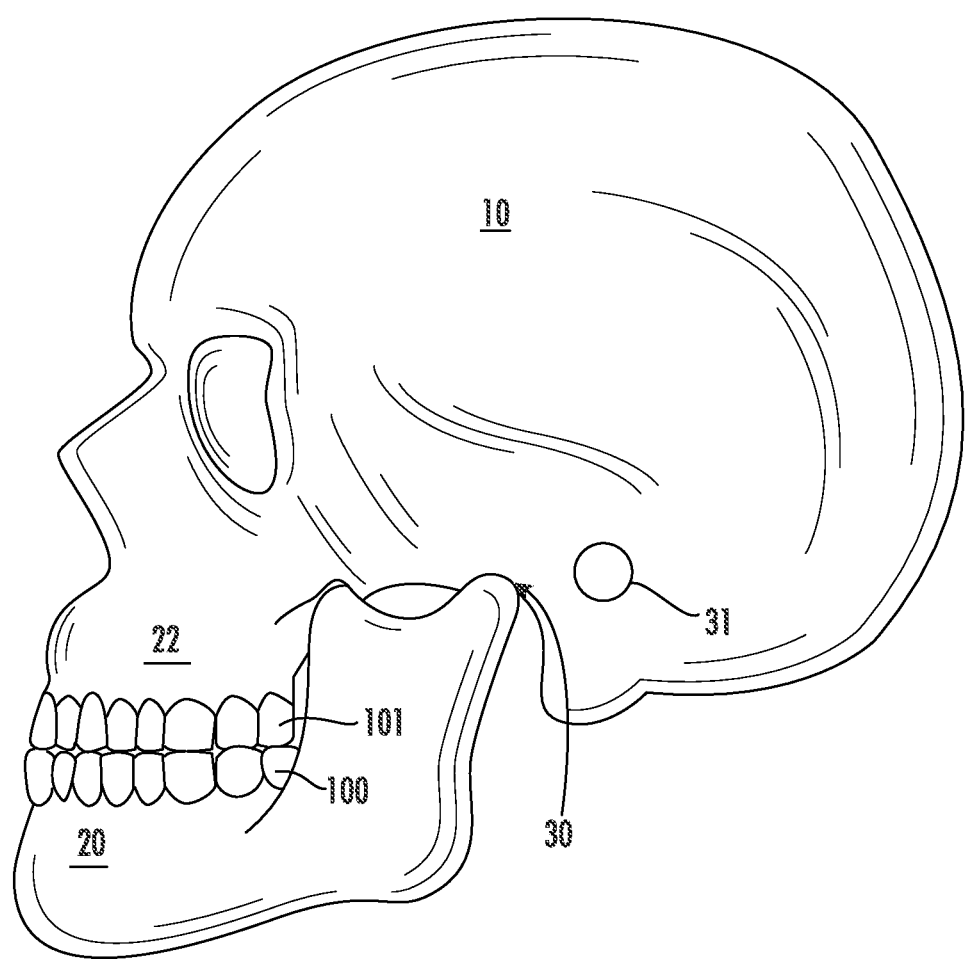
FIG. 1 is an elevational diagram showing the anatomical relationship of the jaws of a patient.
Figure 2A:
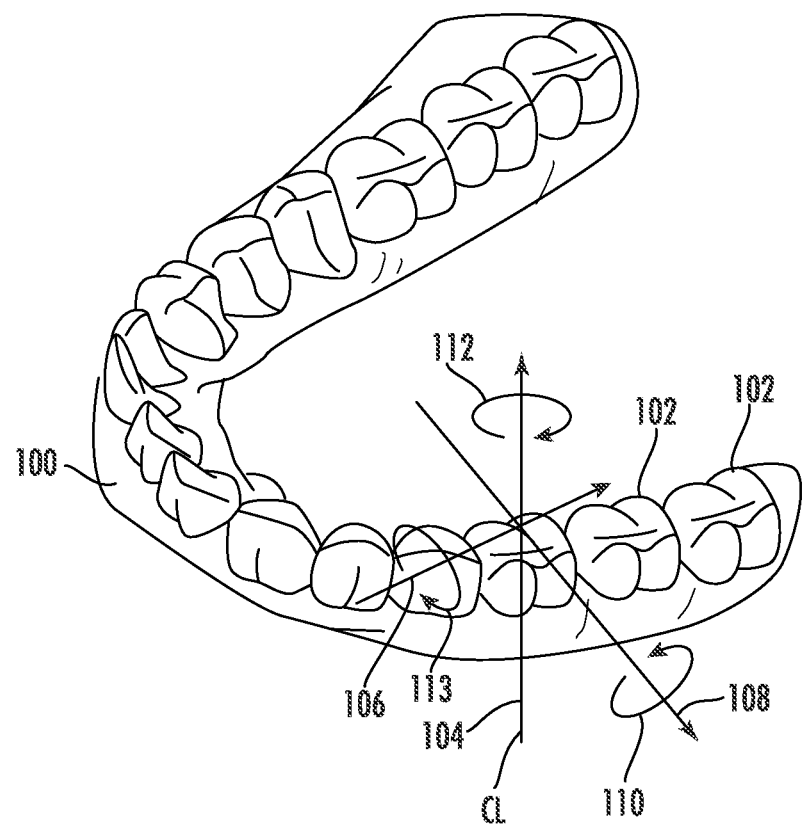
FIG. 2A illustrates in more detail the patient's lower jaw and provides a general indication of how teeth may be moved by the methods and apparatus of the present invention.
Figure 2B:
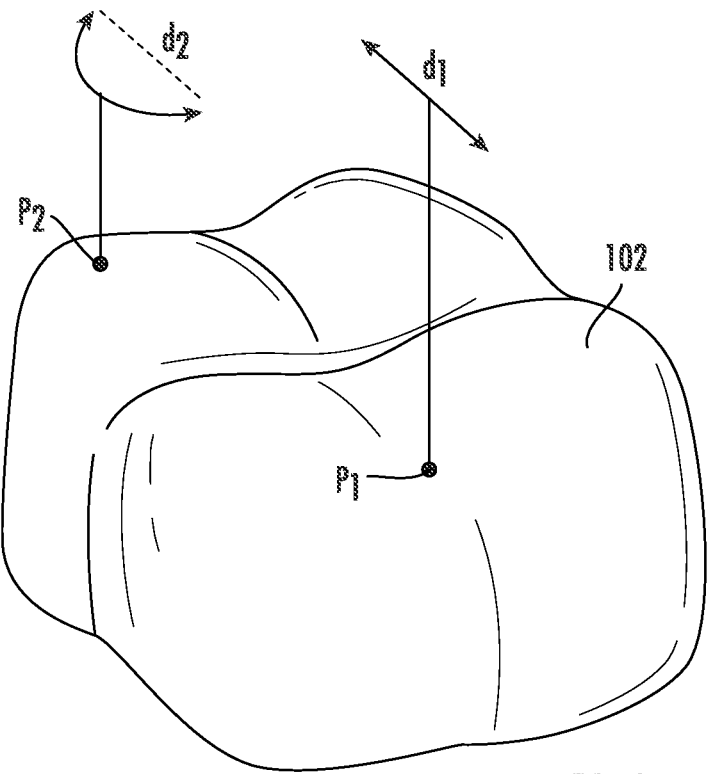
FIG. 2B illustrates a single tooth from FIG. 2A and defines how tooth movement distances are determined.
Figure 2C:
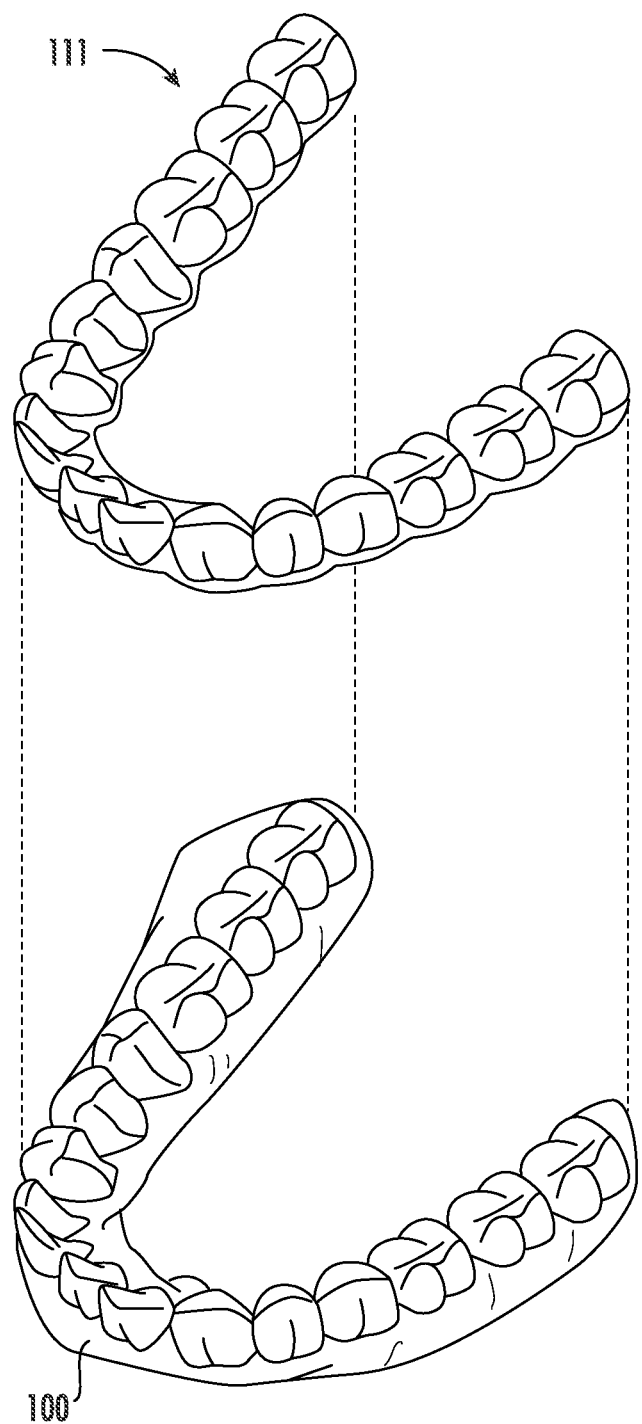
FIG. 2C illustrates the jaw of FIG. 2A together with an incremental position adjustment appliance which has been configured according to the methods and apparatus of the present invention.
Figure 3:
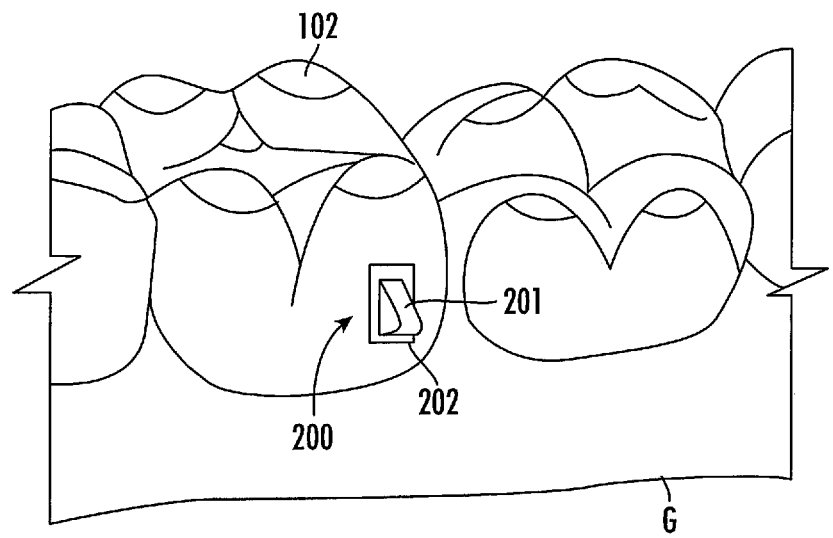
FIG. 3 illustrates a tooth that has an attachment device bonded thereon.
Figure 4:
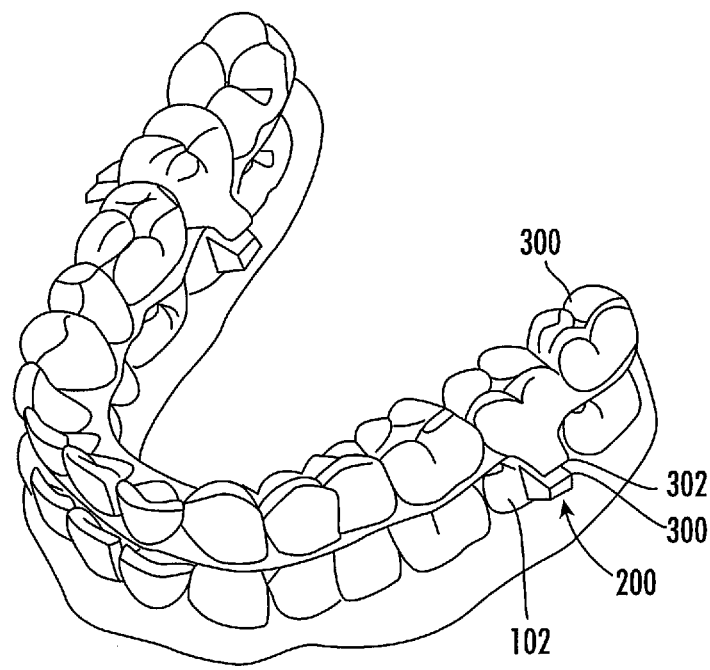
FIG. 4 illustrates the attachment device of FIG. 3 bonded to one of teeth and an appliance having corresponding mating feature being secured to the teeth.

As required, a detailed illustrative embodiment of the present disclosure is disclosed herein. However, techniques, systems, compositions and operating structures in accordance with the present disclosure may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present disclosure.

Reference will now be made in detail to several embodiments of the disclosure that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the disclosure in any manner.

Figure 6:
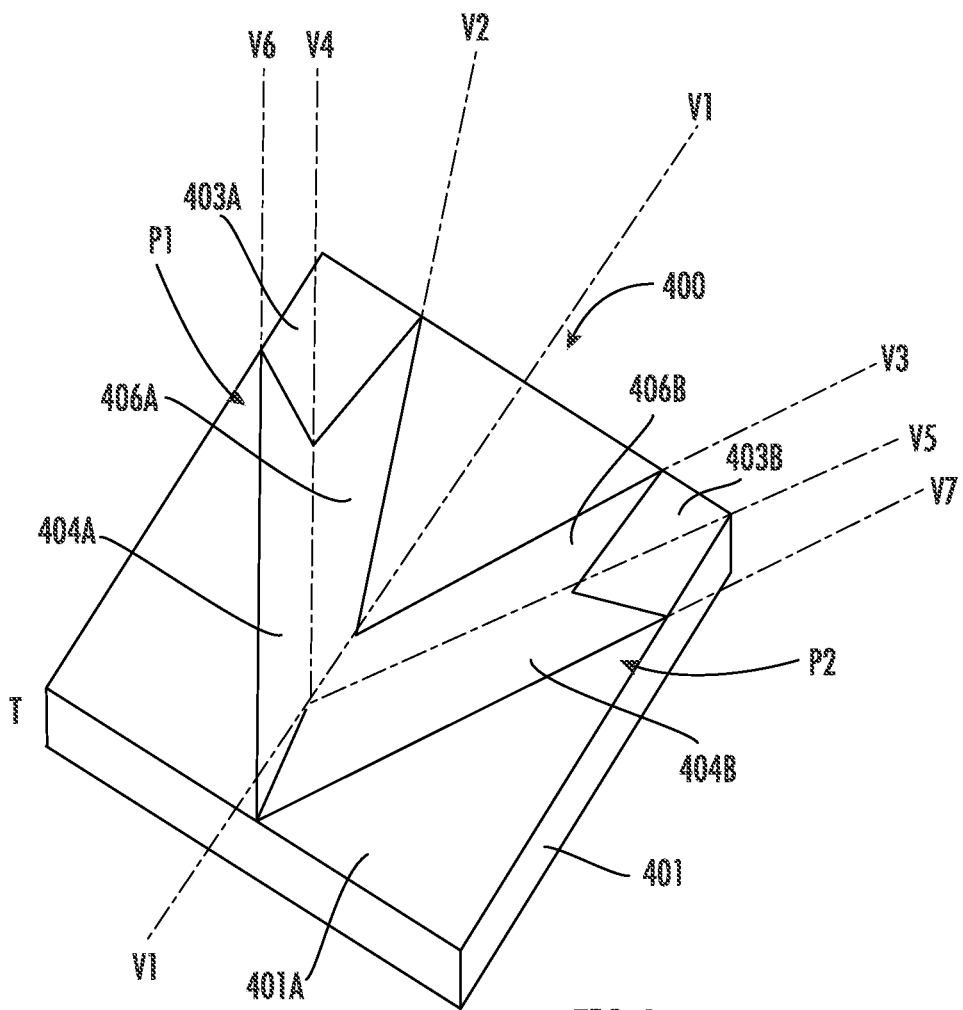
FIG. 6 illustrates an attachment device in accordance with the present disclosure.

Referring to FIG. 6, an attachment device 400 is described. Advantageously, the attachment device 400 is prefabricated and designed to capture the aligner pushing vector in all planes of space and most importantly allows for "forgiveness" in all planes of space due to the multiple planes or faces that the device 400 includes. In contrast, when a traditional attachment is oriented with a perfectly perpendicular face against the direction of tooth movement, it offers maximum surface area for the pushing vector from the aligner but if the aligner does not seat perfectly or the biology of the teeth causes errors in tracking during treatment, the aligner itself will cause iatrogenic tooth movement, if the pushing face of an aligner skips, or moves beyond that perpendicular face and onto the beveled face, the tooth will move in the opposite direction as intended. This problem has been addressed by many practitioners by using the beveled surface on the side from which one wishes to use the pushing force. The drawback of this method is the surface area available for the pushing force is decreased but what is gained is a buffer room for force application area during aligner wear. The attachment designed here is truly multi-planer without sacrificing surface area. This attachment allows for both maximum pushing surface area and allows for aligner forgiveness in all planes of space.

Further, because the attachment device 400 can be used to reposition teeth in a multitude of ways, as the attachment device 400 includes multiple surfaces at least one of which is likely to be engagable with the appropriate indentation or shape on the aligner, the attachment device 400 can be secured to the teeth without taking into consideration which one of its faces or surfaces is to be utilized. Thus, the attachment device 400 can be pre-formed or pre-fabricated and secured to the teeth prior to determining the precise repositioning that is needed for each tooth. In contrast, this would otherwise only be achievable by a particularly purposed attachment that would need to be are designed with software on the digital model after the scan. This means the operator receives an initial aligner to use to deliver the attachments to the teeth for micro-mechanical bonding methods. Dental composite is placed into the wells/positive space for the attachments and then the aligner is seated on the teeth and the composite is then cured/polymerized to the tooth with light initiation of the chemical reaction.

This process has several drawbacks. Firstly, when delivering the attachments there is inevitably the creation of flash, or excess composite in a thin layer that dispels from the area of attachment delivery. Even with the most diligent cleanup with delivery of the attachment, some flash will remain. This flash will distort the seating of the aligner to the tooth surface and hinder accuracy and tracking of the teeth through treatment. This is because, conventionally, it simply cannot be accounted for during the initial treatment planning, as the teeth are scanned and models fabricated prior to the actual attachment delivery. Secondly, dental composites shrink and pull toward their photo-initiation point as they polymerize. This means they pull away from the tooth surface and leave the potential for voids or inadequate fill of the composite into the attachment template. Any distortion of the attachments during delivery is not accounted for in the following treatment trays as the attachments were added digitally prior to the start of treatment.

Figure 5:
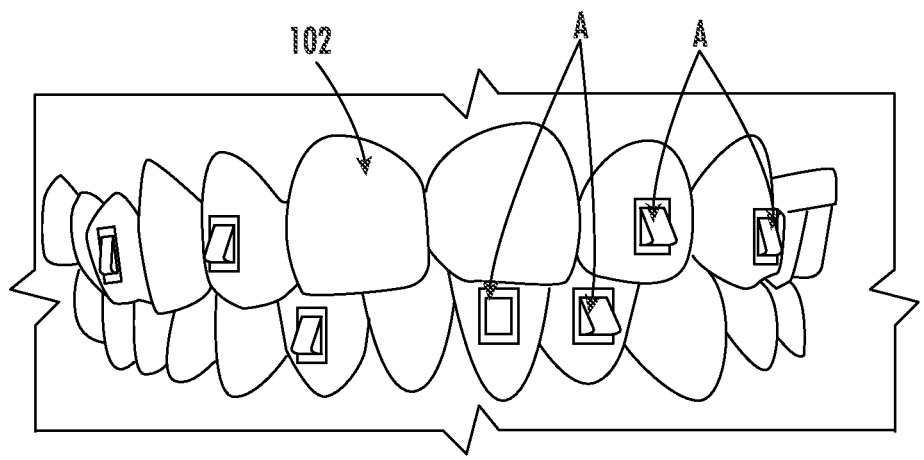
FIG. 5 discloses a variety of attachment devices that have been bonded to teeth at various orientations relative to the teeth.

As already discussed with respect to FIG. 5, conventional attachments are generally selected from two shapes, namely, cubes or rectangular prisms that can be oriented so that they are "beveled" in a desired direction to have a longer face in a given orientation. They need to be oriented as such the beveled portion of the attachment is facing opposite the direction of force application, allowing the beveled surface to be "pressed" on by the aligner. The clinician will place, shape, and orient the attachments using the software to optimize retention and force application. This process takes anywhere from 10 to 60 plus minutes.

Advantageously, in accordance with the present disclosure, having a universal attachment that can be easily placed on any tooth, that is multi-planar in nature with regard to capturing force application, completely removes the need for any attachment-design planning with the software. As discussed, the slight misfit of an aligner appliance with an attachment device causes a gentle urging of a tooth in a desired direction. To that end, such a slight misfit of a fabricated aligner, e.g., aligner appliance 300, and the attachment device 400 will be with respect to the surfaces of the attachment device 400 that are determined to require forces applied thereto to effect desired movements; however, the appliance 300 would be configured to fit properly with respect to the other surfaces of the appliance 300 and the tooth surfaces that should not have forces applied thereto to achieve the desired tooth movement.

Another advantage is that by scanning/impressing teeth that already have attachments on them in accordance with the present disclosure, the aligner appliances that are fabricated will have the most intimate fit possible without the risk of distortion during delivery because the tooth and the attachment secured thereto in its final configuration and orientation was taken into account when fabricating the aligner devices. It is to be understood that the attachment devices 400 may be used in conjunction with conventional aligner appliances such as those discussed above with reference to appliance 300.

The attachment device 400 includes a base 401 that is configured to be secured, e.g., bonded, to lateral surfaces of teeth 102. The securing and bonding of the attachment device 400 to the teeth may be performed utilizing conventional bonding methods known in the art. The base 401 may be generally square shaped and may include a plurality of surfaces disposed on the surface of the base 401. Generally, the device includes a first prism P1 and a second prism P2 that are symmetrically disposed relative to one another along axis V1. The prisms P1 and P2 may be elongated triangular prisms meeting at the center point at the edge of a face at one side of the bracket pad. The triangular prisms have their two faces beveled at 45 degrees from the base, converging at the apex. The attachment will function in a very similar manner if the point of the converging prisms is oriented up toward the cusp of the tooth or down toward the gums. Regardless of the direction of tooth movement, the attachment can be oriented in almost any direction and it still provides two beveled faces for force application.

The surfaces of the prisms P1 and P2 are configured to engage corresponding structures of an orthodontic aligner. The surfaces may generally form a V-shape and a centerline V1-V1 bisecting the attachment device 400 may symmetrically divide the attachment device 400. The surfaces formed on the attachment device 400 may be beveled relative to an upper surface 401A of the base 401 may be beveled or angled relative to the upper surface 401A at substantially 45-degree angles. Moreover, the surfaces may together generally form a V-shape and the highest points of the beveled surfaces relative to the upper surface 401A of the base 401 may be along lines V4 and V5 which may define a 45-degree angle therebetween. Movement faces or beveled surfaces 404A, 404B, 406A, and 406B may be defined between lines V4 and V5 and respective axes V2, V3, V6, and V7 that are defined between those surfaces and the juncture with the upper surface 401A. Axes V2, V4 and V6 may be generally parallel and axes V3, V5, and V7 may be generally parallel. A surface 404A may be defined between axes V4 and V6 and may be angled at substantially 45 degrees relative to the upper surface 401A. A surface 406A may be defined between axes V2 and V4 and may be angled at substantially 45 degrees relative to the upper surface 401A. A surface 404B may be defined between axes V5 and V7 and may be angled at substantially 45 degrees relative to the upper surface 401A. A surface 406B may be defined between axes V3 and V5 and may be angled at substantially 45 degrees relative to the upper surface 401A. A surface 404B may be defined between axes V5 and V7 and may be angled at substantially 45 degrees relative to the upper surface 401A. In addition, at opposing corners symmetrical relative to axis V1, surfaces 403A and 404B may be disposed. The surface 403A may taper downward from a height defined by axis V4 at a 45-degree slope toward the corner of the square upper surface 401A. The surface 403B may taper downward from a height defined by axis V5 and downward at a 45-degree slope toward the corner of the square upper surface 401A.

The base 401 may have a thickness T that may be 0.1 mm and the axes V4 and V5 may be at a height of 2.5 mm relative to the upper surface 401A. The base 401 may be square shaped having sides that are 3-5 mm in size depending on the size of the teeth. The tooth contacting surface of the base 401 may be roughened for enhanced mechanical retention when bonding. The relatively thin thickness T of 0.1 mm, for example, allows for common bracket forceps to be used to deliver the universal attachment to the tooth. A large base also allows for easy application of bonding materials to the underside of the attachment. Again, there are no prefabricated aligner attachments on the market and traditional attachments are delivered by filling the negative space within an aligning tray as described before.

Figure 7:
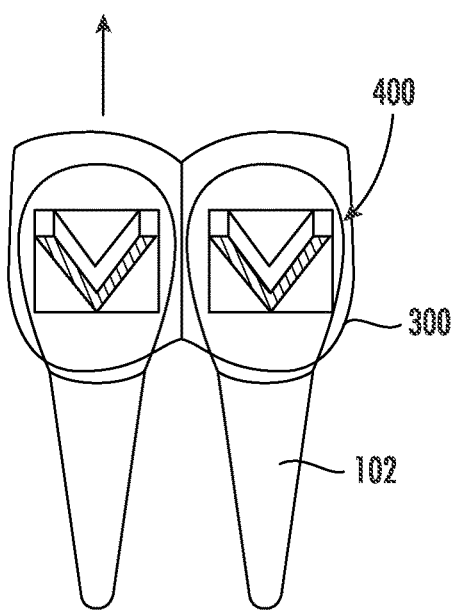
FIGS. 7-15 illustrate the attachment device of FIG. 6 in use.
Figure 8:
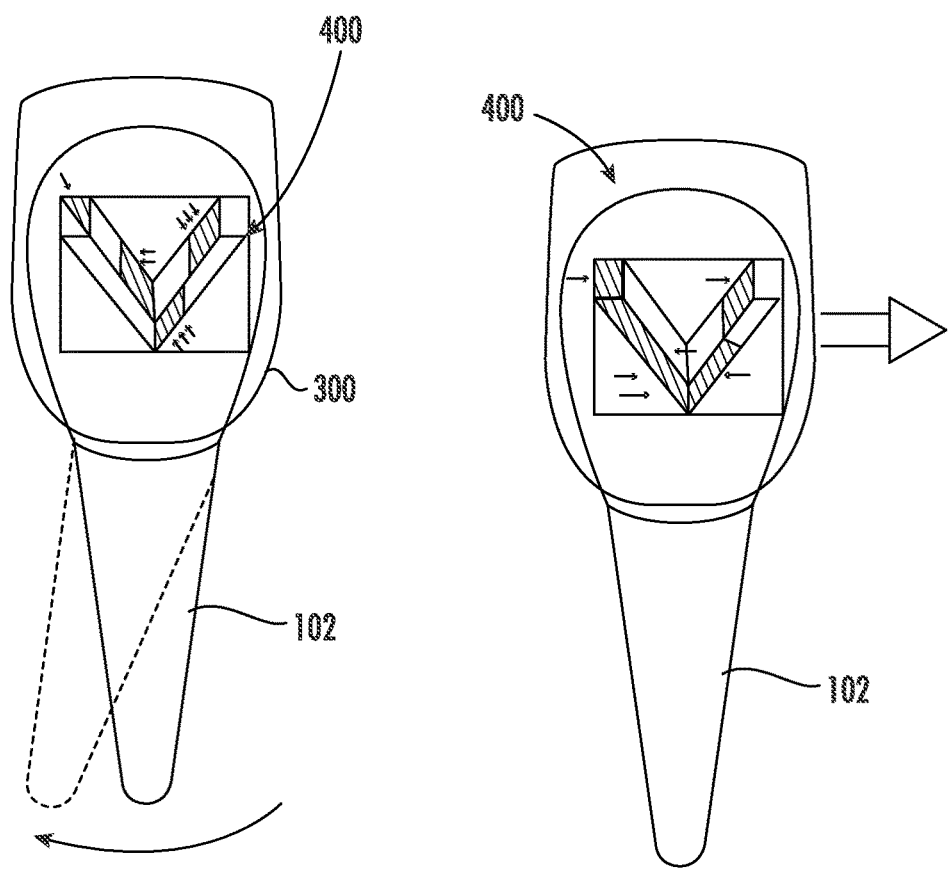
Figure 9:
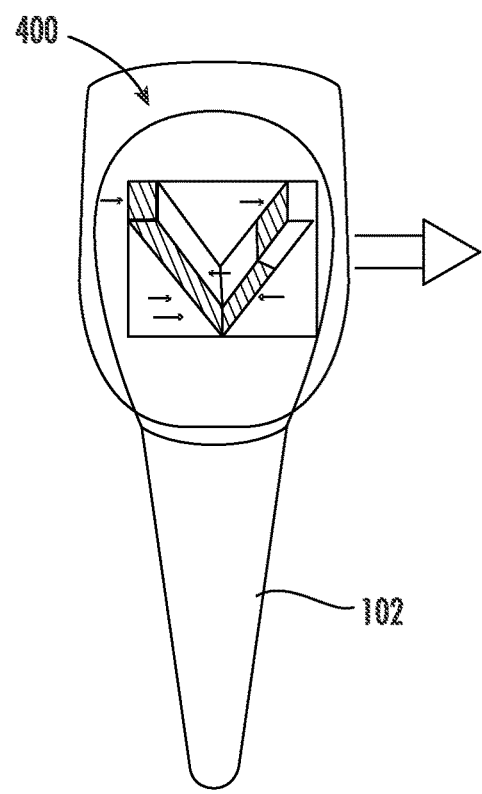

As shown in FIGS. 7-9, the surfaces 404A, 406A, 404B and 406B may generally form a "V-shape" and when placed upon and secured to the tooth, the "V-shape" may be upright, or any orientation.

During use, as shown in FIGS. 7-15, the multi-planar surfaces provide various surfaces on which an appliance or aligner B (which may be substantially similar to the aligners 111 and 300 described above) can engage with the attachment device 400 to effect a desired force upon the tooth 102 to which the attachment device 400 is secured. The attachment device 400 is universal and can be set on a tooth surface prior to a determination of the particular force that is desired to be exerted upon the tooth 102. This means that the attachment device 400 can be secured or bonded to the tooth 102 and the modeling can be made afterward. This increases accuracy because computer modeling often will not account adequately for such things as flash from excess bonding material used to bond conventional attachments to teeth, even if the computer model could account for the attachment itself. In addition, unlike the rectangular attachments discussed above, slight inaccuracies are forgiven as the attachment device 400 includes many surfaces with which the aligner can engage.

In FIGS. 7-15, the attachment device 400 is shown engaging the aligner 300 to effect a variety of tooth movements. In particular, the aligner 300 is shaped to engage one or more surfaces of the attachment device 400. Although illustrated as being the aligner 300, any suitable aligner, e.g., an INVASIGN aligner may be utilized. Surfaces of the attachment device 400 are shown as being shaded to indicate which surfaces pressure or force is to be applied to effect the described correctional movement of the tooth 102. The direction of the force that is applied to the shaded areas of the attachment device 400 is indicated by directional arrows adjacent thereto. It is noted that referring back to FIG. 6, each of the surfaces of the attachment device 400 is labeled with a reference character. The desired final position of the teeth 102 is illustrated in FIGS. 7-15 in a phantom, dotted line and the initial position of the teeth 102 is shown in a solid line.

As shown in FIG. 7, the aligner 300 is shown as being engaged with the attachment device 400 to effect a force(s) upon the surfaces 404A and 404B of the attachment device 400. Over time, as the aligner 300 presses against particular ones of the surfaces of attachment device 400, forces are applied to the tooth 102 to which the attachment device 400 is secured. In FIG. 7, the surfaces 404A and 404B are shown as being shaded to indicate that these surfaces are being pressed against by the aligner 300. The force(s) that are applied to the surfaces 404A and 404B effect an extrusion force upon the teeth 102 as indicated by the upward directional arrow in FIG. 7.

As shown in FIG. 8, root angulation movement of the tooth 102 is also achievable. For example, force may be applied to surfaces 403A and 406B and another force can be applied to surface 404B and 406A about a center of rotation such that a pivoting force in a first direction, as indicated by the illustrated directional arrow, is applied to the tooth. Application forces to surfaces 403B and 406A and another force to surfaces 404A and 406B about a center of rotation may effect a pivoting force in an opposing second direction. It should be understood that root angulation movement may also have a corresponding movement of the angulation of the crown of the tooth and vice versa.

Also for example, as shown in FIG. 9, a lateral movement or translation may be effected by applying a force to surfaces 404A and 403A in a first lateral direction or a force to surfaces 404B and 403B in an opposite lateral direction. The stretch of the plastic of which aligner B is fabricated allows the aligner to seat on the existing tooth position by elastically distorting to the current location/orientation/shape of the tooth. The material memory within the plastic trying to reform to its fabricated shape is what applies the force. A traditional attachment has a single face to capture the movement of the aligner. The attachment presented here has two faces to meet the surface of the aligner which is delivering force for movement. Two orientations for the beveled face to capture this force provides more "give" if the aligner does not seat fully and increases the surface area available compared to one triangular beveled face; as in a traditional attachment.

Figure 10:
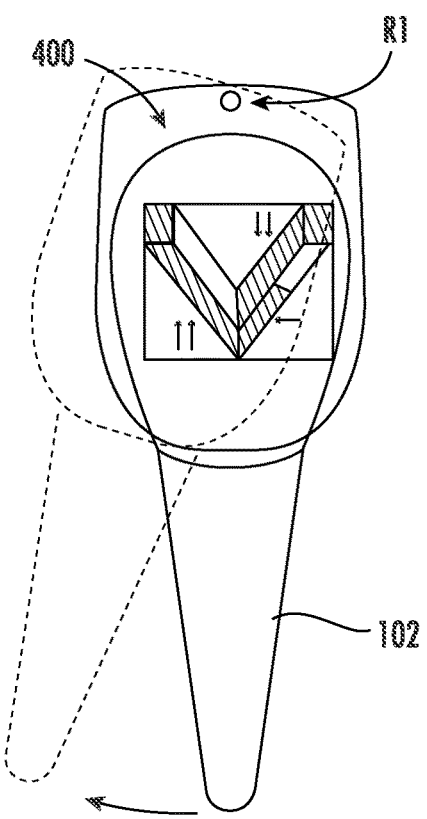
Figure 11:
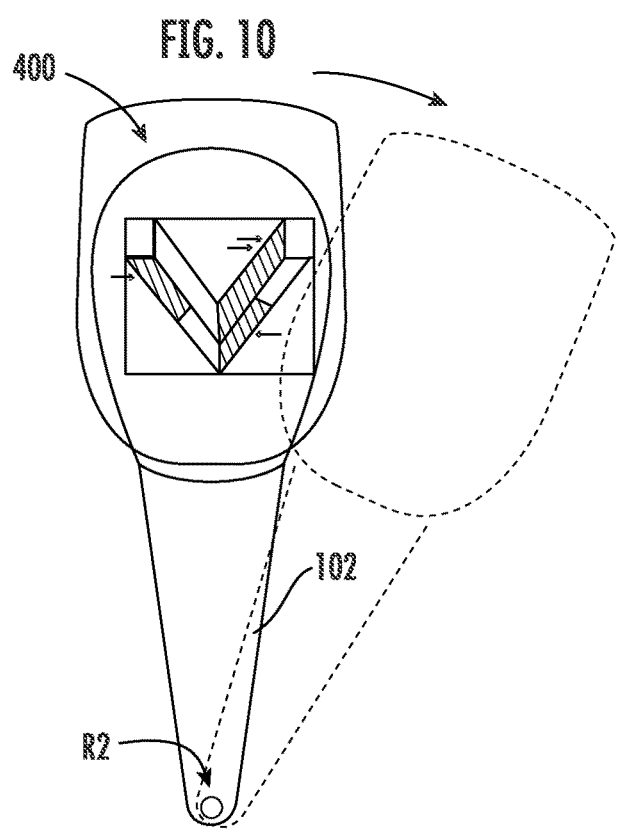

A root angulation of the movement of a tooth was described above with reference to FIG. 8. By way of illustration, root and crown angulation of a tooth are now also described with respect to FIGS. 10 and 11, respectfully. For example, as shown in FIGS. 10 and 11, the tooth 102 may also be rotated or angled about a pivot point R1 or R2, respectively. In particular, to effect a movement of root of the tooth as shown in FIG. 10 by the directional arrow, forces as applied in the direction as indicated by the directional arrows adjacent to the surfaces of the attachment device 400 may be applied to the surfaces of the attachment device 400 that are shaded. In particular, as shown in FIG. 10, forces may be applied to surfaces 403A, 303B, 404A, 406B, and 404B. A downward force may be applied to the surface 406B, an upward force may be applied to the surface 404A, and a force that is oriented in a direction orthogonal to those forces may be applied to a portion of the surface 404B. The combined effect of these forces would be to cause the tooth 102 to pivot about pivot point or axis R1. In contrast, as shown in FIG. 11, forces may be applied against at least a portion of surfaces 404A, 406B, and 404B as indicated by the shading and directional arrows to effect rotation of the tooth 102 about a pivot point or axis R2.

Figure 12:
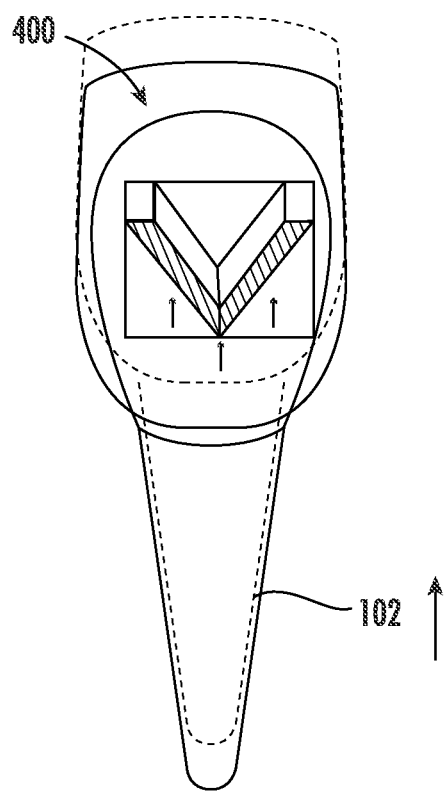
Figure 13:
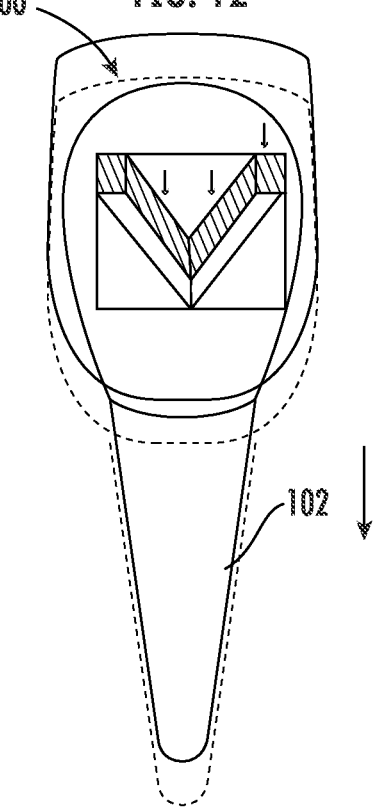
Figure 14:
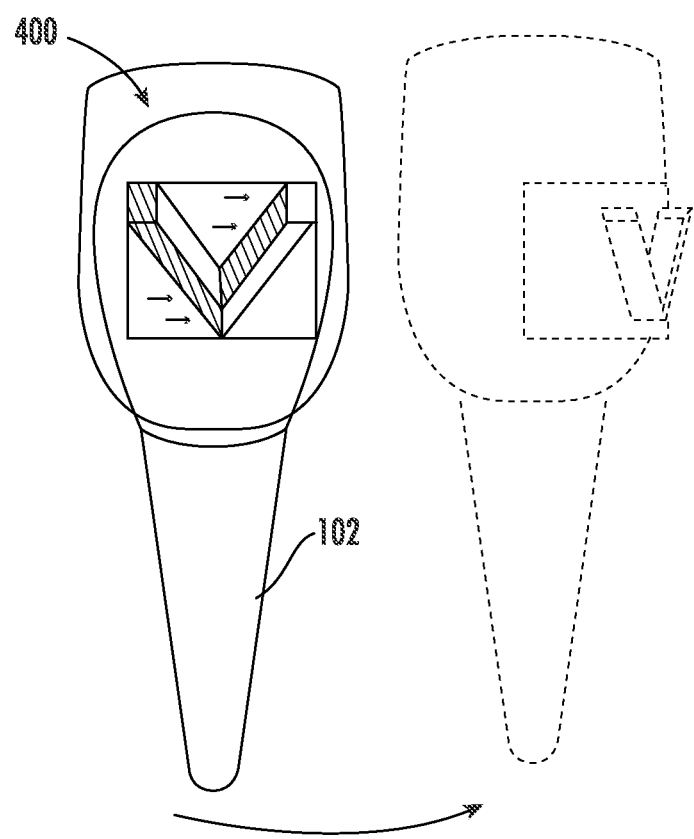
Figure 15:
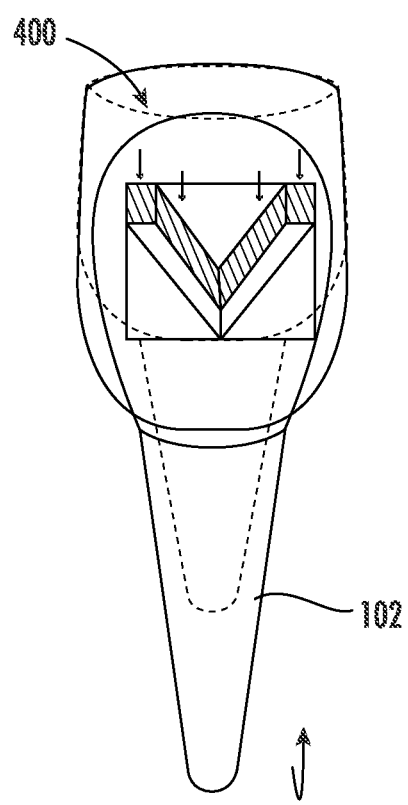

It would be readily understood by a person of ordinary skill in the art that desired movements of the teeth can be achieved by configuring the appliance 300 or the like to have appropriate negative impressions 302 formed in the appliance 300 that when the appliance 300 is placed upon the teeth 102 that the interaction of the appliance 300 with attachment 400 will effect the desired movement. The particularly disclosed movements are merely illustrative but are not intended to be limiting. For example, when a force is applied to surface 404B and to surface 406A, a rotative force on the tooth may result. While FIG. 7 illustrated an example in which extrusion of teeth 102 may be effected through the application of force upon various surfaces of the attachment member 400, FIGS. 12-13 illustrated that the attachment member 400 includes opposing surfaces that can be engaged or acted upon to effect opposite movements. In particular, while applying forces to the bottom surfaces 404A and 404B may effect extrusion of the tooth 102 as shown in FIG. 12, applying forces instead to opposing ones of those surfaces, namely surfaces 403A, 403B, 406A, and 406B may effect intrusion of the tooth 102 as shown in FIG. 13. It is noted that as shown in FIG. 15, intrusion of the tooth 102 may be effected by applying forces to surfaces 406A and 406B without applying forces to surfaces 403A and 403B as well.

Referring back to FIG. 14, rotation of the tooth from an initial position (solid line) to a final position (phantom, dashed line) may be effected by applying forces to the shaded surfaces 403A, 404A, and 406B to cause the tooth to rotate about its center line CL and also to translate laterally.

It is noted that the above examples are merely illustrative and that various combinations of the surfaces of the attachment member 400 may be selected for the aligner 300 to engage to effect various forces and correctional movements upon the teeth 102.

As already discussed, conventionally, aligner appliances require subsequent placement of attachment devices after determining the shape of the aligner appliance. Here, a scan is performed subsequent to placement and bonding of the attachment device 400 onto lateral tooth surfaces. The scan may not distinguish between tooth surface and the attachment 400, but may instead consider the tooth and the attachment 400 as a single item. Since attachment 400 is registered as tooth surface during the digital scan of the teeth, the clinician has the option of adding more attachments during software modeling or choosing not to do so. It is noted that current software such as ALIGN TECHNOLOGY'S INVISALIGN'S CLINCHECK has no capability of knowing if there is adequate surface area or morphology on a tooth for the appropriate force delivery of any given aligner. In other words, the software will recognize the attachment 400 as being tooth structure and will recommend a shape of the aligner 300 to have a configuration that will effect the desired forces upon the surfaces of the attachment device 400 (which the software has interpreted as being tooth structure), and any suitable actual tooth surface, to effect the desired corrective movements of the teeth 102.

Advantageously, regardless of the ultimate desired correction of a tooth position or angulation, the presently disclosed universal attachment device may be affixed to a tooth. Even in a situation where no corrective movement of the tooth is needed, the presently disclosed universal attachment device may be affixed to the tooth. Thereafter, a determination of the desired corrective movement of the teeth may be made whether manually by an expert's examination of the patient or by utilizing software such as that described herein. This is a tremendous time saver as compared to the conventional methods in which an attachment must be customized for each and every tooth. As discussed above, the conventional methods are also inaccurate because conventionally a scan of a tooth occurs prior to the placement of conventional attachments and a corresponding custom aligner is generated without factoring in for the possibility that during the affixation of the customized conventional attachment devices there may be excess material (e.g., flash or bonding material) which would mean that the aligners and the customized conventional attachment devices do not interact as expected and the resultant corrective movement of the teeth may be less than ideal. In contrast, the present disclosure provides attachment devices that can be secured or affixed to the teeth prior to determining the configuration of a corresponding aligner. This greatly increases time efficiency and accuracy resulting in reduced time for treating the patient and a better result.

Having described at least one of the preferred embodiments of the present disclosure with reference to the accompanying drawings, it is to be understood that such embodiments are merely exemplary and that the disclosure is not limited to those precise embodiments, and that various changes, modifications, and adaptations may be effected therein by one skilled in the art without departing from the scope or spirit of the disclosure as defined in the appended claims. The scope of the disclosure, therefore, shall be defined solely by the following claims. Further, it will be apparent to those of skill in the art that numerous changes may be made in such details without departing from the spirit and the principles of the disclosure. It should be appreciated that the present disclosure is capable of being embodied in other forms without departing from its essential characteristics.

What is claimed is:

1. A universal attachment device configured to be secured to a tooth for engagement with a removable dental positioning appliance, comprising: a mounting surface configured to be secured to the tooth; and an attachment surface, the attachment surface generally opposing the mounting surface and including a plurality of movement faces, each of the plurality of movement faces being configured to interact with the removable dental positioning appliance, the interaction of the removable dental appliance with each of the plurality of movement faces effecting a force upon each of the movement faces, the force having a magnitude and a direction, wherein at least one of the movement faces interacts with the removable dental appliance such that the force applied to the at least one of the movement faces has a magnitude that is substantially zero and at least another one of the movement faces interacts with the removable dental appliance such that the force applied to the at least another one of the movement faces has a magnitude that is greater than zero, further comprising a first prism, the first prism being defined by at least a first portion of the plurality of movement faces and further comprising a second prism, the second prism being defined by at least a second portion of the plurality of movement faces, wherein the first prism and the second prism define a substantially 45-degree angle therebetween and define a V-shape, the first prism and the second prism having a common first end, each of the first prism and the second prism extending lengthwise from the common first end.

2. The universal attachment device of claim 1, wherein an application of a combination of forces upon particular ones of the plurality of movement faces results in a net force upon the tooth to effect a desired repositioning movement of the tooth when the attachment device is attached to the tooth and the removable dental positioned appliance is engaged with the attachment device.

3. The universal attachment device of claim 1, wherein the attachment surface is generally planar and each of the movement faces is angled with respect to the attachment surface.

4. The universal attachment device of claim 1, wherein the first and second prisms are symmetrically disposed relative to one another along an axis bisecting a side of the mounting surface.

5. The universal attachment device of claim 4, wherein the mounting surface is configured as a square shape.

6. The universal attachment device of claim 1, wherein each of the first prism and the second prism include three of the plurality of movement faces, each of the movement faces of the first and second prisms being angled relative to one another.

7. A universal attachment device, comprising: a V-shaped prism comprising: a first movement face and a second movement face, the first and second movement faces extending along a first axis, the first movement face and the second movement face being angled with respect to one another; a third movement face and a fourth movement face, the third and fourth movement faces extending along a second axis, the third movement face and the fourth movement face being angled with respect to one another, the first axis and the second axis defining a substantially 45-degree angle therebetween; a fifth movement face, the fifth movement face being disposed at a first end of the V-shaped prism, the fifth movement face being angled with respect to the first and second movement faces; and a sixth movement face, the sixth movement face being disposed at a second end of the V-shaped prism, the first and second ends of the V-shaped prism being symmetrically positioned with respect to an axis bisecting the V-shaped prism, the sixth movement face being angled with respect to the third and fourth movement faces.

8. A method for correcting tooth positioning, comprising the steps of: providing a universal attachment device, comprising: a V-shaped prism comprising: a first movement face and a second movement face, the first and second movement faces extending along a first axis, the first movement face and the second movement face being angled with respect to one another; a third movement face and a fourth movement face, the third and fourth movement faces extending along a second axis, the third movement face and the fourth movement face being angled with respect to one another, the first axis and the second axis defining a substantially 45-degree angle therebetween; a fifth movement face, the fifth movement face being disposed at a first end of the V-shaped prism, the fifth movement face being angled with respect to first and second movement faces; and a sixth movement face, the sixth movement face being disposed at a second end of the V-shaped prism, the first and second ends of the V-shaped prism being symmetrically positioned with respect to an axis bisecting the V-shaped prism, the sixth movement face being angled with respect to the third and fourth movement faces; affixing the universal attachment device to a tooth; determining a combination of the first movement face, the second movement face, the third movement face, the fourth movement face, the fifth movement face, and the sixth movement face to which to apply a force to effect a tooth movement.

9. The method of claim 7, wherein the combination effects the tooth movement, the tooth movement being an extrusion of the tooth.

10. The method of claim 7, wherein the combination effects the tooth movement, the tooth movement being an intrusion of the tooth.

11. The method of claim 7, wherein the combination effects the tooth movement, the tooth movement being a lateral movement of the tooth.

12. The method of claim 7, wherein the combination effects the tooth movement, the tooth movement being a rotation of the tooth.

13. The method of claim 7, wherein the combination effects the tooth movement, the tooth movement being a root angulation movement of the tooth.

14. The method of claim 7, wherein the combination effects the tooth movement, the tooth movement being a crown angulation movement of the tooth.

15. The method of claim 7, wherein the combination effects a root angulation and a crown angulation.

16. The method of claim 7, wherein the step of determining occurs after the step of affixing.

\* \* \* \* \*